(12) United States Patent
Simpson et al.

(10) Patent No.: US 9,420,900 B1
(45) Date of Patent: Aug. 23, 2016

(54) MOBILE INVENTORY RACK APPARATUS AND INVENTORY RACK SYSTEM

(71) Applicant: Toyota Motor Engineering & Manufacturing North America, Inc., Erlanger, KY (US)

(72) Inventors: Bradley Thomas Simpson, Rodney (CA); Robert Howard Bartholomew, Woodstock (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 4 days.

(21) Appl. No.: 14/609,278

(22) Filed: Jan. 29, 2015

(51) Int. Cl.
*A47F 1/12* (2006.01)
*F16M 11/42* (2006.01)
*B65G 11/20* (2006.01)
*B65G 13/075* (2006.01)

(52) U.S. Cl.
CPC ............... *A47F 1/12* (2013.01); *B65G 11/203* (2013.01); *B65G 13/075* (2013.01); *F16M 11/42* (2013.01)

(58) Field of Classification Search
CPC .... B65G 1/023; B65G 11/023; B65G 13/075; B65G 2209/04; B65G 2209/042; F16M 11/42
USPC .......... 414/268, 270, 274, 277, 276; 211/183, 211/151, 59.2
See application file for complete search history.

(56) References Cited

U.S. PATENT DOCUMENTS

| 5,224,812 | A |   | 7/1993  | Oslin et al.                          |
|-----------|---|---|---------|---------------------------------------|
| 5,295,591 | A | * | 3/1994  | Slater ............... A47B 47/027 211/151 |
| 5,358,097 | A | * | 10/1994 | Bakkila ............. B65G 47/261 198/781.06 |
| 5,429,225 | A | * | 7/1995  | Schiesser .......... B65G 47/261 198/781.06 |
| 5,735,661 | A | * | 4/1998  | De Frondeville ...... G07F 9/06 193/36 |
| 5,810,154 | A | * | 9/1998  | Brouwer ........... B65G 47/261 198/502.3 |
| 5,873,473 | A | * | 2/1999  | Pater ................ B65G 1/06 211/151 |
| 6,135,299 | A | * | 10/2000 | Burgess ............. A47B 46/00 211/150 |

(Continued)

*Primary Examiner* — Kaitlin Joerger
(74) *Attorney, Agent, or Firm* — Christopher G. Darrow; Darrow Mustafa PC

(57) ABSTRACT

An inventory rack system and a mobile inventory rack apparatus are disclosed. The mobile inventory rack apparatus includes an inventory conveyor configured to translate articles of inventory and a receiving system including a requirement indicator disposed along the inventory conveyor. The requirement indicator has an inventory required state when not in contact with an article of inventory. The mobile inventory rack apparatus further includes a supply system including a pair of spaced stoppers disposed along the inventory conveyor. Each stopper has an extended position preventing translation of the articles of inventory and a retracted position allowing translation of the articles of inventory. The inventory conveyor is configured to receive at least one article of inventory when the requirement indicator is in the inventory required state and to allow removal of at least one article of inventory when one of the stoppers is in the retracted position.

20 Claims, 4 Drawing Sheets

(56) References Cited

U.S. PATENT DOCUMENTS

| | | | |
|---|---|---|---|
| 6,347,710 B1 * | 2/2002 | Ryan, Jr. | B07C 1/025 209/706 |
| 6,357,985 B1 * | 3/2002 | Anzani | B65G 1/08 193/35 R |
| 6,431,808 B1 * | 8/2002 | Lowrey | B65G 1/023 193/35 R |
| 6,588,608 B2 * | 7/2003 | Pater | B65G 1/023 211/151 |
| 6,612,798 B2 * | 9/2003 | de Jong | B65G 1/026 414/276 |
| RE38,517 E * | 5/2004 | Pfeiffer | B65G 13/12 193/35 R |
| 6,843,632 B1 * | 1/2005 | Hollander | B65G 1/06 198/347.4 |
| 6,848,567 B2 * | 2/2005 | Kilper | B65G 47/261 198/460.1 |
| 6,866,463 B2 | 3/2005 | Riordan et al. | |
| 6,948,900 B1 * | 9/2005 | Neuman | B62B 3/002 193/35 R |
| 7,140,503 B2 * | 11/2006 | Krummell, Jr. | B65G 1/026 193/35 R |
| 7,553,118 B1 * | 6/2009 | Doepker | B65G 1/08 198/347.2 |
| 7,591,105 B2 * | 9/2009 | Balser | A47B 88/04 52/29 |
| 7,806,646 B2 | 10/2010 | Riordan et al. | |
| 7,810,656 B2 * | 10/2010 | Lewis | B65G 1/06 211/151 |
| 7,815,060 B2 * | 10/2010 | Iellimo | B65G 1/023 108/61 |
| 8,556,060 B2 * | 10/2013 | Sejourne | B65G 47/8823 193/35 A |
| 8,739,958 B2 * | 6/2014 | Freudelsperger | B65G 1/08 198/347.1 |
| 8,869,370 B2 | 10/2014 | Kilibarda | |
| 9,162,814 B2 * | 10/2015 | Gronholm | B65D 19/0095 |
| 2002/0085902 A1 * | 7/2002 | Worrel | B65G 1/02 414/276 |
| 2006/0051187 A1 * | 3/2006 | Bell | B65G 1/023 414/276 |
| 2006/0171796 A1 * | 8/2006 | Carrillo Rodriguez | B65G 1/026 414/276 |
| 2008/0145197 A1 * | 6/2008 | Taylor | B65G 1/023 414/276 |
| 2009/0252577 A1 | 10/2009 | Tuffs et al. | |
| 2011/0314665 A1 | 12/2011 | Kilibarda | |
| 2013/0336750 A1 * | 12/2013 | Marti | B29D 30/0016 414/276 |

* cited by examiner

MOBILE INVENTORY RACK APPARATUS AND INVENTORY RACK SYSTEM

BACKGROUND

The manufacturing and assembly process for vehicles requires workers to install various parts to the vehicle as the vehicle moves along an assembly line. The supply of these parts, or inventory, must be replenished during the assembly process, with some parts requiring replenishment more often than others. The frequency of replenishment can depend on the storage area allotted to the parts adjacent to the installation location along the assembly line, the size of the parts, the quantity of the parts used per vehicle, and how many vehicles traveling the assembly line require use of the specific parts.

Traditional part-replenishment systems can include delivery of inventory according to a detailed schedule or delivery of inventory upon specific request by workers on the assembly line. Parts can be delivered, for example, by forklift drivers or automated guided vehicles (AGVs) traveling between an inventory storage location and the various stations of the assembly line requiring the specified parts. Schedule-based delivery systems can be overly complicated to manage, and request-based delivery systems can cause delays along the assembly line. A better part-replenishment system for supplying inventory is thus required to improve the manufacturing and assembly process.

SUMMARY

A mobile inventory rack apparatus serving as part of an inventory rack system is disclosed. The mobile inventory rack apparatus can receive articles of inventory on an as-needed basis from a stationary supply rack apparatus and deliver articles of inventory on an as-needed basis to a receiver rack apparatus located adjacent to the assembly line for a vehicle. The mobile inventory rack apparatus can include an inventory conveyor designed to receive an article of inventory when a requirement indicator has an inventory required state as denoted by the lack of contact with an article of inventory. The mobile inventory rack apparatus can also supply articles of inventory by repositioning a set of paired stoppers that prevent translation of the articles of inventory to allow at least one article of inventory to be removed from the inventory conveyor when a supply lever is contacted by a requirement pin extending from a receiver rack apparatus.

In one implementation, a mobile inventory rack apparatus is disclosed. The mobile inventory rack apparatus includes an inventory conveyor configured to translate articles of inventory and a receiving system including a requirement indicator disposed along the inventory conveyor. The requirement indicator has an inventory required state when not in contact with an article of inventory. The mobile inventory rack apparatus further includes a supply system including a pair of spaced stoppers disposed along the inventory conveyor. Each stopper has an extended position preventing translation of the articles of inventory and a retracted position allowing translation of the articles of inventory. The inventory conveyor is configured to receive at least one article of inventory when the requirement indicator is in the inventory required state and to allow removal of at least one article of inventory when one of the stoppers is in the retracted position.

In another implementation, an inventory rack system is disclosed. The inventory rack system includes a supply rack apparatus and a mobile inventory rack apparatus. The supply rack apparatus includes a supply system. The supply system includes a pair of spaced stoppers disposed along a supply conveyor, each stopper having an extended position preventing translation of articles of inventory and a retracted position allowing translation of the articles of inventory. The supply system also includes a supply lever extending from the supply rack apparatus configured to switch the positions of both of the spaced stoppers. The mobile inventory rack apparatus includes a receiving system. The receiving system includes a requirement indicator disposed along an inventory conveyor, the requirement indicator having an inventory required state when not in contact with an article of inventory. The receiving system also includes a requirement pin extending from the mobile inventory rack apparatus when the requirement indicator is in the inventory required state. The inventory conveyor is configured to receive at least one article of inventory from the supply conveyor in response to the requirement pin of the mobile inventory rack apparatus being contacted by the supply lever of the supply rack apparatus.

BRIEF DESCRIPTION OF THE DRAWINGS

The description herein makes reference to the accompanying drawings wherein like reference numerals refer to like parts throughout the several views, and wherein.

DETAILED DESCRIPTION

A mobile inventory rack apparatus and an inventory rack system including the mobile inventory rack apparatus are described below. The mobile inventory rack apparatus can include at least one inventory conveyor configured to translate articles of inventory. The mobile inventory rack apparatus can deliver the articles of inventory from an inventory source to a line-side storage location for use in a vehicle assembly process. To accomplish delivery on an as-needed basis, the mobile inventory rack apparatus can include a receiving system including a requirement indicator that has an inventory required state only when not in contact with an article of inventory and a supply system preventing translation of articles of inventory until a supply lever on the mobile inventory rack apparatus is contacted by a requirement pin on a receiver rack apparatus located at the line-side storage location.

Figure 1:
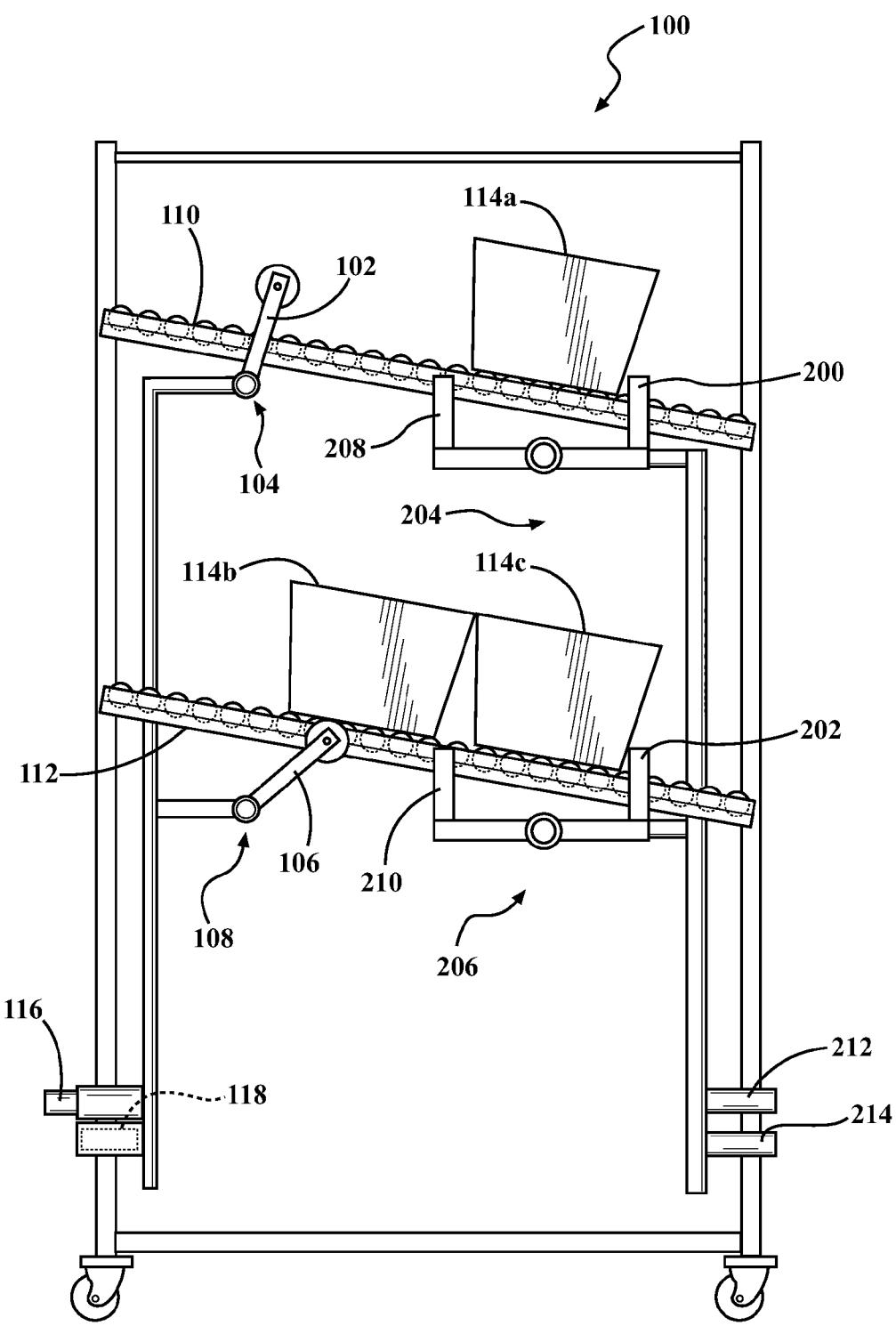
FIG. 1 is a side view of a mobile inventory rack apparatus.

FIG. 1 is a side view of a mobile inventory rack apparatus 100. The mobile inventory rack apparatus 100 described below can move through an assembly plant, either automatically if controlled by an AGV or manually if controlled by an operator. The mobile inventory rack apparatus 100 can be driven adjacent to a stationary supply rack apparatus in order to receive new inventory as needed and be driven adjacent to a stationary receiver rack apparatus to deliver inventory as needed to various stations on an assembly line. The mobile inventory rack apparatus 100 thus facilitates part delivery to the assembly line without the need for either scheduling deliveries or manually requesting parts.

To facilitate receipt of new inventory on an as-needed basis, the mobile inventory rack apparatus 100 includes a requirement indicator 102 as part of an upper conveyor receiving system 104 shown in an inventory required state and a requirement indicator 106 as part of a lower conveyor receiving system 108 shown in an inventory not required state. The upper conveyor receiving system 104 of the mobile inventory rack apparatus 100 (including the requirement indicator 102) is disposed along an upper inventory conveyor 110, and the lower conveyor receiving system 108 (including the requirement indicator 106) is disposed along a lower inventory conveyor 112.

The two inventory conveyors 110, 112 are configured to translate articles of inventory within containers, such as boxes 114a-c, from one side of the mobile inventory rack apparatus 100 to the other side. In this example, the boxes 114a-c are designed to hold vehicle parts, i.e. inventory, for use in the vehicle assembly process. Though the mobile inventory rack apparatus 100 is described here in the context of part delivery for a vehicle assembly line, it is also possible to use the mobile inventory rack apparatus 100 in other delivery contexts, such as in grocery stores or warehouses. Further, though two inventory conveyors 110, 112 are shown, any number of inventory conveyors can be included as part of the mobile inventory rack apparatus 100 since the design is scalable. Each inventory conveyor 110, 112 can be configured to deliver different types of parts on an as-needed schedule given the design of the delivery mechanisms described below.

The inventory conveyors 110, 112 can be sloped in order to use gravity to assist in translation of the boxes 114a-c and can optionally include spaced roller channels to further assist in translation. The requirement indicators 102, 106 can be disposed between the spaced roller channels and are designed to collapse beneath the boxes 114a-c upon contact with the boxes 114a-c in order to indicate the inventory not required state. The requirement indicators 102, 106 can include rollers at distal ends for ease of collapse upon contact. In the example shown in FIG. 1, the requirement indicator 106 has an inventory not required state, i.e., no inventory is required to be added to the lower inventory conveyor 112, since the requirement indicator 106 is in contact with and has collapsed beneath the box 114b. The requirement indicator 102 is not in contact with anything and is positioned upright between the spaced roller channels of the upper inventory conveyor 110. Thus, the requirement indicator 102 has an inventory required state, that is, the upper inventory conveyor 110 is ready to receive an additional article of inventory, e.g. another box of parts.

The upper conveyor receiving system 104 further includes a requirement pin 116 configured to extend from the mobile inventory rack apparatus 100 when the requirement indicator 102 is in the inventory required state as shown. The extension of the requirement pin 116 is based on the upright position of the requirement indicator 102 and the lack of contact with an article of inventory. The requirement pin 116 and the requirement indicator 102 can be joined, for example, by a cable and/or lever system as part of the upper conveyor receiving system 104. The upper inventory conveyor 110 can be designed to receive at least one article of inventory, for example, another box of parts, from a supply rack apparatus in response to the requirement pin 116 being contacted by a supply lever extending from the supply rack apparatus when the mobile inventory rack apparatus 100 passes by the supply rack apparatus.

The lower conveyor receiving system 108 also includes a requirement pin 118, the requirement pin 118 having a retracted position shown in dotted line based on the requirement indicator 106 having an inventory not required state. The retracted position of the requirement pin 118 is thus based on the collapsed position of the requirement indicator 106 below and in contact with the box 114b. Since the requirement pin 118 is in the retracted position, a corresponding supply lever on a supply rack apparatus will not be able to contact the requirement pin 118, and no parts will be transferred to the lower inventory conveyor 112 when the mobile inventory rack apparatus 100 passes by the supply rack apparatus.

The mobile inventory rack apparatus 100 also includes stoppers 200, 202 at the end of the inventory conveyors 110, 112 forming part of an upper conveyor supply system 204 and a lower conveyor supply system 206. When in an extended position as shown, the stoppers 200, 202 prevent translation of articles of inventory. The upper conveyor supply system 204 includes the stopper 200 as part of a pair of spaced stoppers 200, 208 disposed along the upper inventory conveyor 110. Similarly, the lower conveyor supply system 206 includes the stopper 202 as part of another pair of spaced stoppers 202, 210 disposed along the lower inventory conveyor 112. Each of the stoppers 200, 202, 208, 210 has an extended position preventing translation of articles of inventory and a retracted position allowing translation of articles of inventory.

For example, the extended position of the stopper 200 in the upper conveyor supply system 204 is preventing the box 114a from sliding off of the upper inventory conveyor 110. Similarly, the extended position of the stopper 202 in the lower conveyor supply system 206 is preventing the box 114c from sliding off of the lower inventory conveyor 112. In the example shown in FIG. 1, the stoppers 200, 208 are paired, or coupled, in that the extension of the stopper 200 leads to the retraction of the stopper 208. Similarly, the stoppers 202, 210 are paired, and the extension of the stopper 202 leads to the retraction of the stopper 210. The paired extension and retraction can be accomplished using a lever system and common axes of rotation for the connected pairs of stoppers 200, 208 and 202, 210. The mechanisms shown are similar in function to a see-saw, though other mechanical, hydraulic, or electric mechanisms for paired extension and retraction are also possible.

The upper conveyor supply system 204 further includes a supply lever 212 configured to switch the positions of both of the spaced stoppers 200, 208 when contacted by a requirement pin extending from a receiver rack apparatus. Similarly, the lower conveyor supply system 206 further includes a supply lever 214 configured to switch the positions of both of the spaced stoppers 202, 210 when contacted by a requirement pin extending from a receiver rack apparatus. Once the supply levers 212, 214 are contacted by the applicable requirement pins, the stoppers 200, 202 can be retracted, and the boxes 114a,c can be automatically released from the respective inventory conveyors 110, 112. The spacing between the paired stoppers 200, 208 and 202, 210 is such that a single article of inventory can be positioned along the inventory conveyors 110, 112 between the sets of paired stoppers 200, 208 and 202, 210. However, the spacing can be such that any number of articles of inventory can be designed to be released from the respective inventory conveyors 110, 112 upon retraction of the respective stoppers 200, 202.

Figure 2:
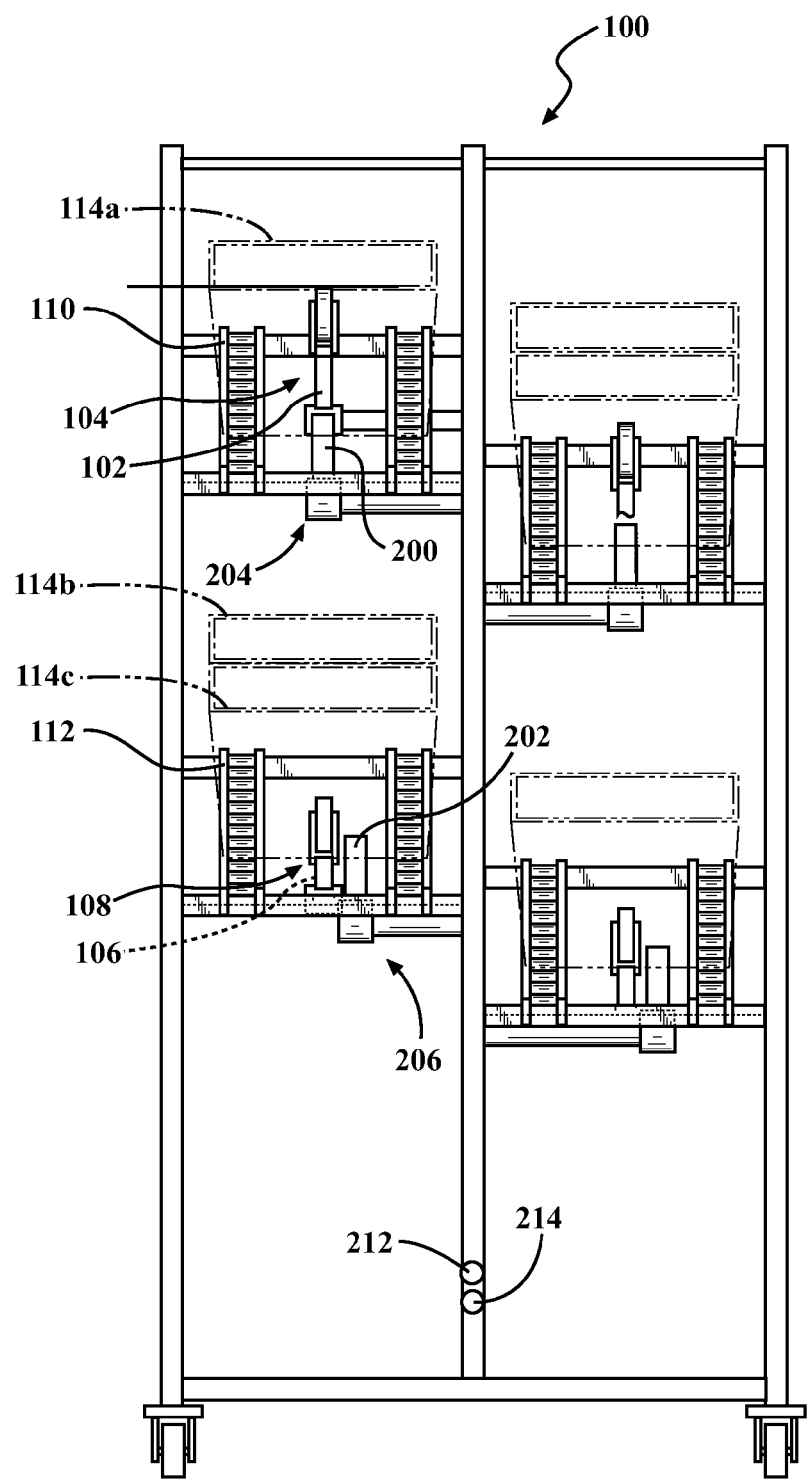
FIG. 2 is an end view of the mobile inventory rack apparatus of FIG. 1.

FIG. 2 is an end view of the mobile inventory rack apparatus 100 of FIG. 1, more specifically, a right-end view of FIG. 1. In this view, the supply levers 212, 214 are shown in a stacked vertical condition, with the supply lever 212 directly above the supply lever 214. The boxes 114a-c are shown in dotted line so that the details of the conveyor receiving systems 104, 108 and the conveyor supply systems 204, 206 located along the inventory conveyors 110, 112 are visible. This right-end view is included to show that additional inventory conveyors (not numbered) can be present as part of the mobile inventory rack apparatus 100, for example, in the form of another column of two inventory conveyors located to the right of the inventory conveyors 110, 112. Thus, the example in FIG. 2 is a mobile inventory rack apparatus 100 capable of receiving and supplying four different types of inventory. The remainder of the description refers only to the left side of the mobile inventory rack apparatus 100 of FIG. 2 for simplicity, but it is understood that the mechanisms associated with the inventory conveyors 110, 112 can also be implemented with additional inventory conveyors forming a larger mobile inventory rack apparatus 100. Thus, the design is scalable.

Figure 3:
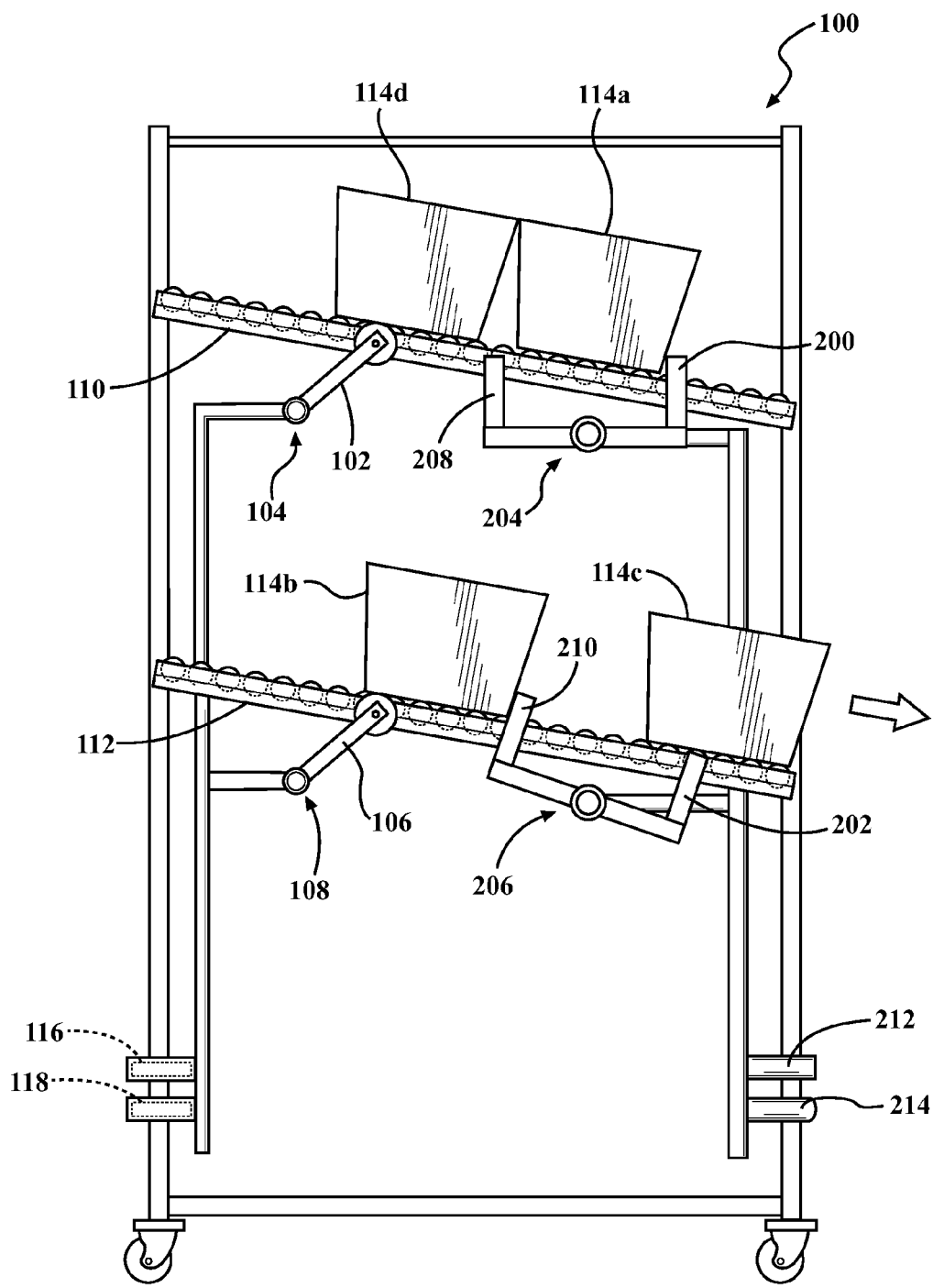
FIG. 3 is another side view of the mobile inventory rack apparatus of FIG. 1.

FIG. 3 is another side view of the mobile inventory rack apparatus 100 of FIG. 1. In this example, the requirement indicators 102, 106 of both the upper conveyor receiving system 104 and the lower conveyor receiving system 108 have an inventory not required state. As compared to FIG. 1, another box 114d of parts has been received on the upper inventory conveyor 110, thus both the upper inventory conveyor 110 and the lower inventory conveyor 112 are full, with the boxes 114a and 114d located on the upper inventory conveyor 110 and the boxes 114b and 114c located on the lower inventory conveyor 112.

Once received on the upper inventory conveyor 110, the box 114d makes contact with the requirement indicator 102, moving the requirement indicator 102 beneath the box 114d as shown. The box 114b remains in contact with the requirement indicator 106. Given the presence of the boxes 114b, 114d in contact with the requirement indicators 102, 106, both of the requirement pins 116, 118 are in the retracted state, indicating that no additional inventory is currently required by the mobile inventory rack apparatus 100. If the mobile inventory rack apparatus 100 passes a supply rack apparatus in this configuration, no articles of inventory will be transferred from the supply rack apparatus to the mobile inventory rack apparatus 100.

In FIG. 3, the stopper 202 in the pair of spaced stoppers 202, 210 in the lower conveyor supply system 206 has a retracted position allowing translation of an article of inventory, i.e. box 114c, from the lower inventory conveyor 112. The supply lever 214 has been contacted by a requirement pin extending from a receiver rack apparatus, leading to the rotated state of the supply lever 214 as shown. In response to the supply lever 214 being contacted and rotated, the stopper 202 was retracted at the same time that the stopper 210 was extended. This coordinated motion is achieved by coupling the motion of the paired stoppers 202, 210 to the motion of the supply lever 214, using, for example, a combination of cables and levers. Once the stopper 202 is retracted, the box 114c can slide from the lower inventory conveyor 112 to, for example, a receiver rack apparatus. The sliding motion of the box 114c is indicated by an arrow.

At the same time that the box 114c is released by the retraction of the stopper 202, the box 114b is halted by the extension of the stopper 210. In this example, the stopper 210 extends into the space between the boxes 114b and 114c to stop the motion of the box 114b, but if no space is present between the boxes 114b and 114c, the stopper 210 can be designed to impact the bottom of the box 114b to stop its motion while the box 114c slides off of the lower inventory conveyor 112. Thus, the spacing of the paired stoppers 202, 210 controls the number of articles of inventory that are released from the lower inventory conveyor 112 upon contact with the supply lever 214.

The paired stoppers 202, 210 can also include a counter-weight return mechanism. Once the appropriate number of articles of inventory is released, in this example, just the single box 114c, the stopper 202 can return to its extended position and the leftmost stopper 210 can return to its retracted position, allowing the box 114b to slide down the lower inventory conveyor 112 to rest at the stopper 202. In turn, the requirement indicator 106 will be released from contact with the box 114b to return to the inventory required state extending up through the lower inventory conveyor 112, and the requirement pin 118 will be triggered to extend from the mobile inventory rack apparatus 100.

The same supply mechanisms described in respect to the lower inventory conveyor 112 are present on the upper inventory conveyor 110. That is, the paired stoppers 200, 208 are coupled to the supply lever 212. Contact made with the supply lever 212 will retract the stopper 200 and allow removal of the box 114a while at the same time extending the stopper 208 and stopping translation of the box 114d just until removal of the box 114a is complete and the counter-weight mechanism returns the stopper 200 to the extended position and the stopper 208 to the retracted position. At this point, the box 114d will be free to slide into contact with the stopper 200 and the requirement indicator 102 will be released, allowing extension of the requirement pin 116 indicating the inventory required state for the upper conveyor receiving system 104. The mobile inventory rack apparatus 100 described in the preceding figures is further described as part of an inventory rack system below.

Figure 4:
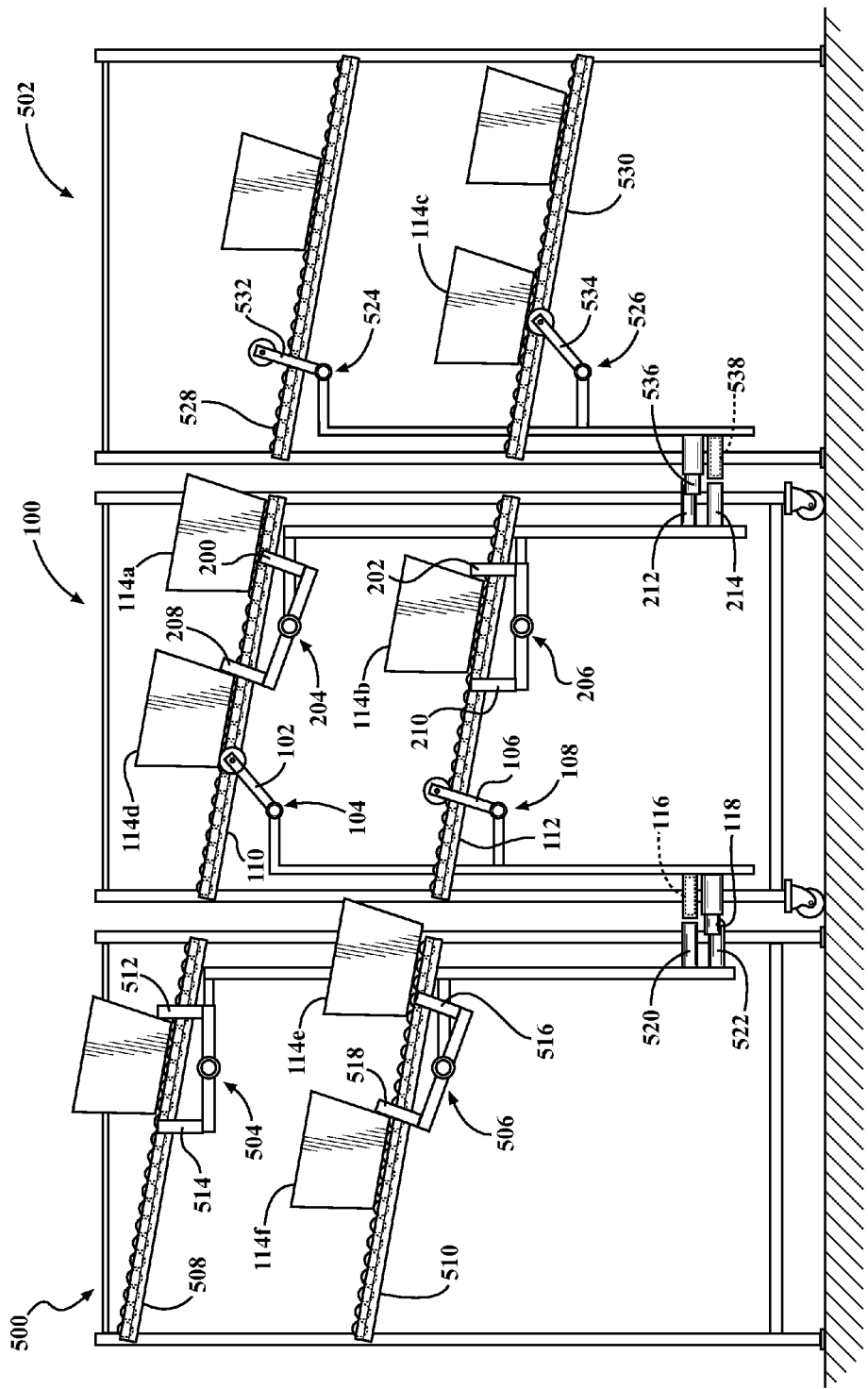
FIG. 4 is a side sectional view of an inventory rack system including a supply rack apparatus, the mobile inventory rack apparatus of FIGS. 1-3, and a receiver rack apparatus.

FIG. 4 is a side sectional view of an inventory rack system including a supply rack apparatus 500, the mobile inventory rack apparatus 100 of FIGS. 1-3, and a receiver rack apparatus 502. The supply rack apparatus 500 includes a pair of supply systems 504, 506 each disposed along a supply conveyor 508, 510 and including a pair of spaced stoppers 512, 514 and 516, 518. Each stopper 512, 514, 516, 518 has an extended position preventing translation of articles of inventory and a retracted position allowing translation of articles of inventory. The upper pair of spaced stoppers 512, 514 is coupled to a supply lever 520 extending from the supply rack apparatus 500 and the lower pair of spaced stoppers 516, 518 is coupled to a supply lever 522 extending from the supply rack apparatus 500. The supply levers 520, 522 are configured to switch the positions of the respective spaced stoppers 512, 514 and 516, 518 upon contact, for example, between retracted and extended positions.

In the example shown in FIG. 4, the supply lever 522 is being contacted by the requirement pin 118 of the mobile inventory rack apparatus 100, and the stopper 516 is consequently retracted, allowing box 114e to move from the supply rack apparatus 500 to the mobile inventory rack apparatus 100. At the same time, the stopper 518 is extended, impeding the motion of box 114f until the transfer of the box 114e is complete. The supply lever 520 is not contacted by the corresponding requirement pin 116 because the requirement pin 116 is retracted based on the presence of the box 114d in contact with the requirement indicator 102 on the upper inventory conveyor 110 of the mobile inventory rack apparatus 100.

The receiver rack apparatus 502 includes a pair of receiving systems 524, 526 each disposed along a receiver conveyor 528, 530 and including a requirement indicator 532, 534. The requirement indicators 532, 534 have inventory required states when not in contact with an article of inventory and inventory not required states when in contact with an article of inventory. The receiving systems 524, 526 further include requirement pins 536, 538 configured to extend from the receiver rack apparatus 502 when the requirement indicators 532, 534 are in the inventory required state. In this example, the box 114c was previously transferred to the receiver conveyor 530 by the mobile inventory rack apparatus 100 and is now in contact with the requirement indicator 534. Consequently, the related requirement pin 538 is retracted and does not contact the supply lever 214 of the mobile inventory rack apparatus 100. Thus, no articles of inventory will be transferred between the lower inventory conveyor 112 and the receiver conveyor 530.

The example shown in FIG. 4 has the requirement indicator 532 in a position extending upright through the receiver conveyor 528, making no contact with any articles of inventory. Thus, the requirement pin 536 is extended from the receiver rack apparatus 502 and can contact the supply lever 212 when the mobile inventory rack apparatus 100 travels by the receiver rack apparatus 502. Upon contact between the requirement pin 536 and the supply lever 212, the stopper 200 located on the upper inventory conveyor 110 is retracted, and the box 114a can transfer between the upper inventory conveyor 110 and the receiver conveyor 528. At the same time, the stopper 208 extends to impede motion of the box 114d until the transfer of the box 114a is complete. Once the box 114a transfers from the mobile inventory rack apparatus 100 to the receiver rack apparatus 502, the box 114a will contact the requirement indicator 532 which in turn will retract the requirement pin 536, indicating that the receiver conveyor 528 is full.

The mobile inventory rack apparatus 100 described in the preceding figures allows for as-needed supply of inventory between an inventory source, such as the stationary supply rack apparatus 500, and assembly stations on the assembly line that include limited storage for inventory, such as the receiver rack apparatus 502, each shown in FIG. 4. Though not shown in the figures, the mobile inventory rack apparatus 100 can also be designed to receive receptacles for articles of inventory, for example, empty boxes, from the assembly stations and return the empty boxes back to the inventory source to be refilled using either the same receiving systems and supply systems described above, or simplified receiving systems and supply systems designed for empty box return, but designed in a reverse direction.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A mobile inventory rack apparatus, comprising:
   an inventory conveyor configured to translate articles of inventory; and
   a receiving system including:
      a requirement indicator disposed along the inventory conveyor, the requirement indicator having an inventory required state when not in contact with an article of inventory; and
      a requirement pin configured to extend from the mobile inventory rack apparatus when the requirement indicator is in the inventory required state;
   wherein the inventory conveyor is configured to receive at least one article of inventory from a supply rack apparatus in response to the requirement pin being contacted by a supply lever extending from the supply rack apparatus when the requirement indicator is in the inventory required state.

2. The mobile inventory rack apparatus of claim 1, wherein the inventory conveyor includes spaced roller channels and the requirement indicator is disposed between the spaced roller channels.

3. The mobile inventory rack apparatus of claim 1, wherein the requirement indicator has an inventory not required state when in contact with an article of inventory.

4. The mobile inventory rack apparatus of claim 3, wherein the inventory conveyor is configured to not receive any articles of inventory when the requirement indicator is in the inventory not required state.

5. The mobile inventory rack apparatus of claim 3, wherein the requirement indicator is configured to collapse beneath the article of inventory in the inventory not required state.

6. The mobile inventory rack apparatus of claim 1, further comprising:
   a supply system including a pair of spaced stoppers disposed along the inventory conveyor, each stopper having an extended position preventing translation of the articles of inventory and a retracted position allowing translation of the articles of inventory;
   wherein the inventory conveyor is configured to allow removal of at least one article of inventory when one of the stoppers is in the retracted position.

7. The mobile inventory rack apparatus of claim 6, wherein the inventory conveyor includes spaced roller channels and the spaced stoppers are disposed between the spaced roller channels.

8. The mobile inventory rack apparatus of claim 6, wherein the supply system further includes a supply lever configured to switch the positions of both of the spaced stoppers when contacted by a requirement pin extending from a receiver rack apparatus.

9. The mobile inventory rack apparatus of claim 8, wherein at least one article of inventory is removed from the inventory conveyor in response to the supply lever being contacted by the requirement pin extending from the receiver rack apparatus.

10. The mobile inventory rack apparatus of claim 6, wherein at least one article of inventory can be positioned along the inventory conveyor between the spaced stoppers.

11. An inventory rack system, comprising:
   a supply rack apparatus, comprising:
      a supply system, including:
         a pair of spaced stoppers disposed along a supply conveyor, each stopper having an extended position preventing translation of articles of inventory and a retracted position allowing translation of the articles of inventory; and
         a supply lever extending from the supply rack apparatus and configured to switch the positions of both of the spaced stoppers; and
   a mobile inventory rack apparatus, comprising:
      a receiving system, including:
         a requirement indicator disposed along an inventory conveyor, the requirement indicator having an inventory required state when not in contact with an article of inventory; and
         a requirement pin extending from the mobile inventory rack apparatus when the requirement indicator is in the inventory required state;
      wherein the inventory conveyor is configured to receive at least one article of inventory from the supply conveyor in response to the requirement pin of the mobile inventory rack apparatus being contacted by the supply lever of the supply rack apparatus.

12. The inventory rack system of claim 11, wherein the supply conveyor and the inventory conveyor are configured to translate articles of inventory using spaced roller channels.

13. The inventory rack system of claim 12, wherein the spaced stoppers are disposed between the spaced roller channels of the supply conveyor and the requirement indicator is disposed between the spaced roller channels of the inventory conveyor.

14. The inventory rack system of claim 11, wherein the mobile inventory rack apparatus further includes:
 a supply system, including:
  a pair of spaced stoppers disposed along the inventory conveyor, each stopper having an extended position preventing translation of articles of inventory and a retracted position allowing translation of the articles of inventory; and
  a supply lever extending from the mobile inventory rack apparatus and configured to switch the positions of both of the spaced stoppers.

15. The inventory rack system of claim 14, further comprising:
 a receiver rack apparatus, comprising:
  a receiving system, including:
   a requirement indicator disposed along a receiver conveyor, the requirement indicator having an inventory required state when not in contact with an article of inventory; and
   a requirement pin extending from the receiver rack apparatus when the requirement indicator is in the inventory required state;
  wherein the receiver conveyor is configured to receive at least one article of inventory from the inventory conveyor in response to the requirement pin of the receiver rack apparatus being contacted by the supply lever of the mobile inventory rack apparatus.

16. The inventory rack system of claim 15, wherein the receiver conveyor includes spaced roller channels and the requirement indicator of the receiving system is disposed between the spaced roller channels.

17. The inventory rack system of claim 11, wherein the requirement indicator has an inventory not required state when in contact with an article of inventory.

18. The inventory rack system of claim 17, wherein the inventory conveyor is configured to not receive any articles of inventory from the supply conveyor when the requirement indicator is in the inventory not required state.

19. The inventory rack system of claim 17, wherein the requirement indicator is configured to collapse beneath the article of inventory in the inventory not required state.

20. The inventory rack system of claim 14, wherein at least one article of inventory can be positioned along the inventory conveyor between the spaced stoppers.

* * * * *